F. W. WEIBEL.
LAWN MOWER ATTACHMENT.
APPLICATION FILED JUNE 5, 1916.
1,221,930.
Patented Apr. 10, 1917.
2 SHEETS—SHEET 1.
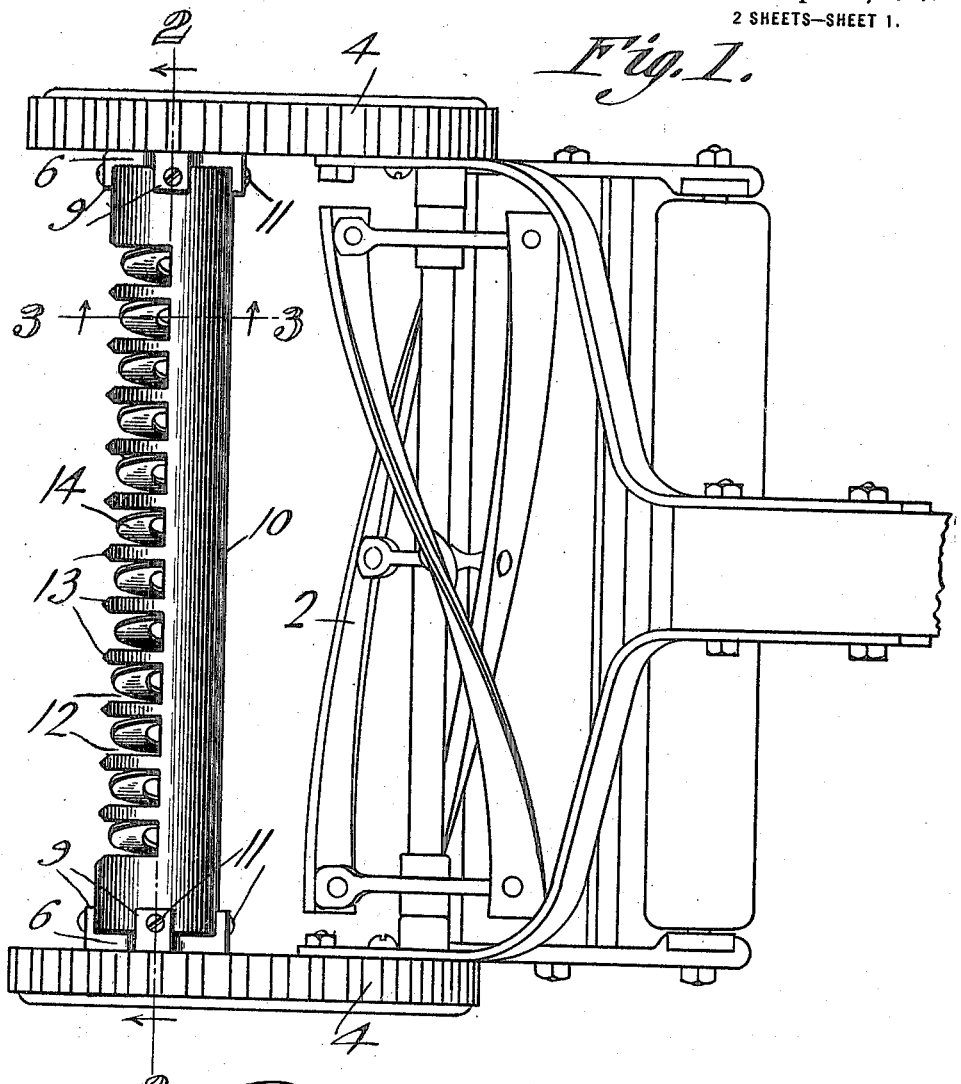
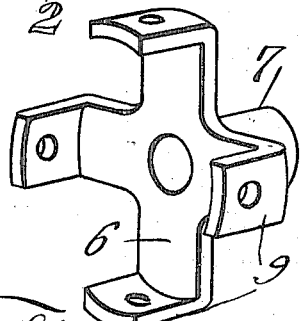

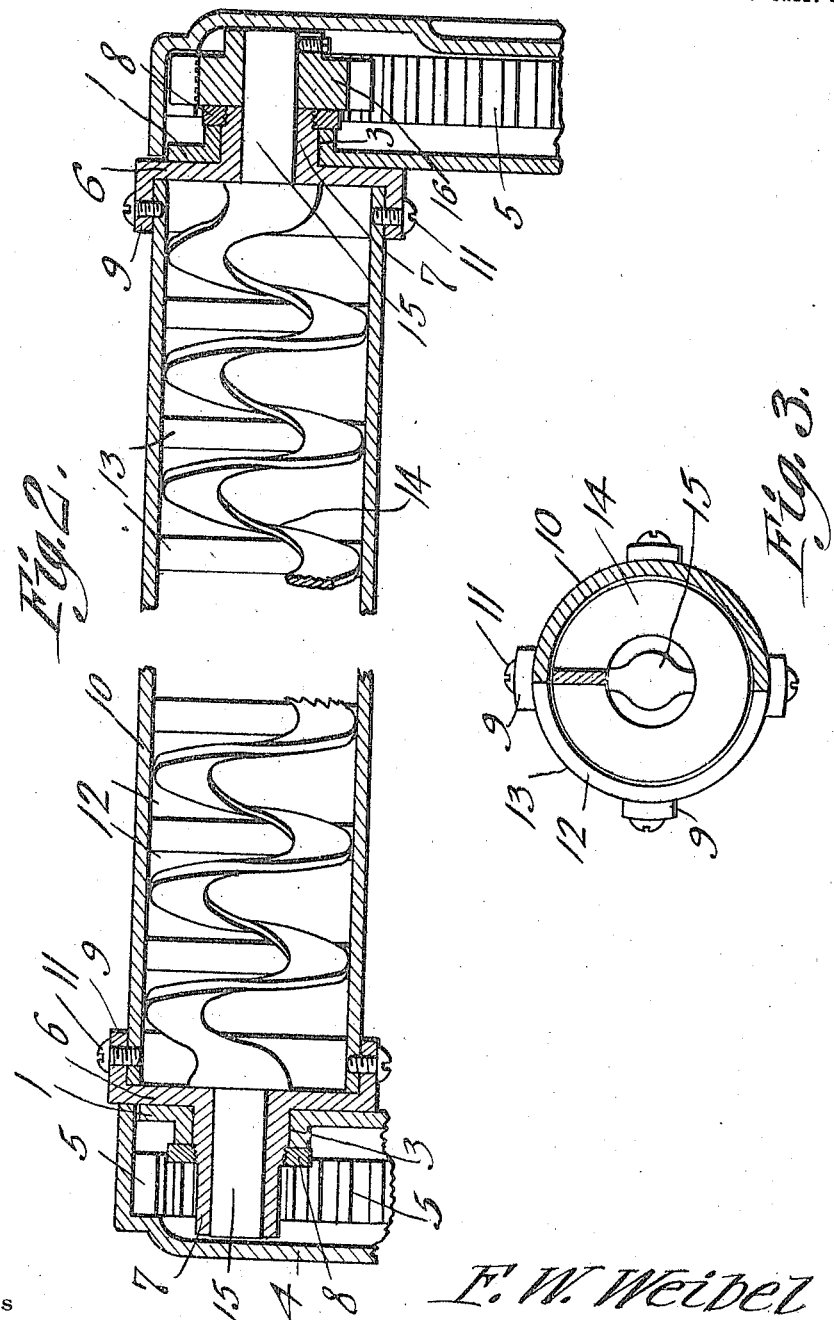

UNITED STATES PATENT OFFICE.

FREDDERICK W. WEIBEL, OF HARVARD, ILLINOIS.

LAWN-MOWER ATTACHMENT.

1,221,930. Specification of Letters Patent. Patented Apr. 10, 1917.

Application filed June 5, 1916. Serial No. 101,791.

*To all whom it may concern:*

Be it known that I, FREDDERICK W. WEIBEL, a citizen of the United States, residing at Harvard, in the county of McHenry and State of Illinois, have invented a new and useful Lawn-Mower Attachment, of which the following is a specification.

The present invention appertains to lawn mowers, and aims to provide a novel and improved attachment for lawn mowers which is operable for cutting long grass, weeds, dandelion stems, and the like, whereby the lawn mower will cut the long grass and weeds close to the ground, to eliminate the necessity of the long grass and weeds being cut by a sickle or shears as usual.

It is the object of the invention to provide a secondary or auxiliary cutting device for a lawn mower operable in advance of the main cutter to cut the tops of long grass and weeds, whereby the remaining blades or stems will be cut off by the main cutter, thus leaving the grass cut neat, without the presence of long weeds, dandelion stems, and the like, which are ordinarily left uncut by a lawn mower.

It is also the object of the invention to provide a secondary or auxiliary cutting device for lawn mowers which can be readily applied or attached to various lawn mowers with but little trouble, and without requiring any changes or alterations in the lawn mower construction, the present device replacing the usual stay rod which connects the side plates of the lawn mower above and in front of the rotary cutter.

A further object of the invention is the provision of a device of the nature indicated which is extremely simple, compact and inexpensive in construction, which will operate easily so as not to impair the operation of the lawn mower, and which will perform its office in a thoroughly practical and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a plan view of a lawn mower showing the attachment applied.

Fig. 2 is an enlarged longitudinal section of the device taken on the line 2—2 of Fig. 1, portions being broken away.

Fig. 3 is an enlarged cross section of the device taken on the line 3—3 of Fig. 1.

Fig. 4 is a perspective view of one of the bearings.

In the drawings, an ordinary lawn mower is depicted, the general construction of which is well known and understood, so that no detailed consideration thereof is necessary. The lawn mower includes the side plates 1 between which the rotary cutter 2 is mounted, the side plates 1 having apertures 3 which ordinarily receive the ends of a transverse stay rod, which is removed in the present instance to be replaced by the attachment forming the subject matter of this invention. The ground wheels 4 are disposed upon the outer sides of the plates 1 as usual, and have internal gear teeth 5.

In carrying out the invention, the attachment includes a pair of bearings applicable to the plates 1 of the lawn mower frame, and each bearing includes a plate 6 adapted to be applied to the inner side of one plate 1 and having an outstanding tubular bearing 7 insertible outwardly through the aperture 3 of said plate 1. A nut 8 or other retaining element can be threaded or otherwise engaged upon the bearing 7 to bear against the outer side of the plate 1, for clamping the plate 6 and its bearing 1 to the respective side plate 1. The plates 6 of the bearings have inwardly projecting ears 9.

Disposed transversely between the bearings is a tubular guard 10 having its terminals abutting the plates 6 and fitting snugly between the ears 9, set screws 11 or other securing elements being engaged through the ears 9 and bearing against or engaging the guard 10 to clamp it to the bearings, whereby the guard and bearings provide a rigid stay for connecting the plates 1 in lieu of the ordinary stay. The forward side of the guard 10 is provided with vertical slots 12 providing vertical arcuate stationary cutters 13 between which the long grass and weeds pass when the lawn mower is moved forwardly.

Rotatable snugly within the tubular guard 10 is a helical or spiral cutter 14, preferably having one convolution for each cutter 13, and the ends of the cutter 14 have longitudinally projecting trunnions 15 journaled through the bearings 7. Keyed or otherwise secured upon one trunnion 15 is a pinion 16 meshing with the internal gear teeth 5 of one wheel 4, although a pinion 16 can be secured upon each trunnion 15 in some cases if desired.

From the foregoing, taken in connection with the drawings, it will be observed that the present device can be readily applied to the lawn mower by persons who are unskilled, as well as mechanics.

When the lawn mower is operated in the usual manner, the secondary or auxiliary cutting device will be moved slightly ahead of the main rotary cutter 2, and the long grass, weeds, and the like, will pass between the stationary cutters 13, and since the cutter 14 is rotated by reason of the pinion 16 being operated by one ground wheel 4, the convolutions of the cutter 14 will provide a shearing action with the cutters 13, thus cutting the grass, weeds, and the like.

It will be noted that the shearing action takes place along the vertical edges of the cutters 13, and that the cutter 14 shifts the weeds transversely against the cutters 13, in order that the grass and weeds will be sheared or cut effectively. The remaining blades or stems of grass, weeds and the like will be sufficiently short so that they will be cut close to the ground by the rotary main cutter 2. The cutter 14 will rotate easily, and will not impair the usual operation of the lawn mower.

Having thus described the invention, what is claimed is:—

1. A lawn mower attachment embodying a transverse guard having a series of cutters, means for attaching the ends of said guard to the side plates of an ordinary lawn mower, and a rotary helical cutter assembled with said guard to coöperate with the aforesaid cutters and having means at one end adapted to be operatively connected with one of the ground wheels of the lawn mower at the outer sides of the said plates.

2. A lawn mower attachment embodying a tubular guard having slots providing cutters, means for attaching the ends of said guard to the side plates of a lawn mower, a helical cutter rotatable within said guard to provide a shearing action with the aforesaid cutters, and means for operatively connecting one end of the helical cutter with one ground wheel of the lawn mower.

3. A lawn mower attachment embodying a pair of bearings attachable to the side plates of an ordinary lawn mower between the ground wheels at the outer sides of said plates, a transverse guard having its ends attached to said bearings to be carried thereby, said guard having a series of cutters, and a helical cutter coöperating with the aforesaid cutters and having terminal trunnions journaled in said bearings.

4. A lawn mower attachment embodying bearings applicable to the side plates of a lawn mower, a tubular guard having its ends attached to said bearings and having slots providing cutters, a helical cutter rotatable snugly within said guard and having terminal trunnions journaled in said bearings, and means for operatively connecting one trunnion with one ground wheel of the lawn mower.

5. A lawn mower attachment embodying a pair of plates having outstanding bearings insertible through apertures in the side plates of a lawn mower, means for clamping the bearings in place relative to said side plates, a transverse tubular guard having its ends abutting the first mentioned plates, means for attaching the first mentioned plates and terminals of the guard together, said guard having vertical slots providing vertical cutters, a helical cutter rotatable snugly within the guard and having terminal trunnions journaled in said bearings, and a pinion secured upon one trunnion to mesh with the internal gear teeth of one ground wheel of the lawn mower.

In testimony that I claim the foregoing as my own, I have hereto affixed my signature in the presence of two witnesses.

FREDDERICK W. WEIBEL.

Witnesses:
  IVY E. SIMPSON,
  PHILOMENA A. ROCKELLI.

Copies of this patent may be obtained for five cents each, by addressing the "Commissioner of Patents, Washington, D. C."